(12) United States Patent
Attar

(10) Patent No.: US 6,758,567 B2
(45) Date of Patent: Jul. 6, 2004

(54) ONE-PIECE REFLECTIVE MARKING SHEET

(76) Inventor: Adl Attar, P.O. Box 3883, Ontario, CA (US) 91761

( * ) Notice: Subject to any disclaimer, the term of this patent is extended or adjusted under 35 U.S.C. 154(b) by 200 days.

(21) Appl. No.: 10/054,308

(22) Filed: Jan. 22, 2002

(65) Prior Publication Data

US 2003/0139107 A1 Jul. 24, 2003

(51) Int. Cl.[7] ............................................. G02B 5/124
(52) U.S. Cl. ..................... 359/531; 359/529; 359/532; 359/546; 359/547; 40/903; 428/54; 428/55; 428/56; 428/141; 428/156; 428/161; 428/166; 428/167; 428/204; 428/206; 428/209; 428/210; 428/424.2; 428/424.4
(58) Field of Search ................................ 359/529, 530, 359/531, 532, 546, 547; 40/903; 428/54, 55, 56, 141, 156, 161, 167, 204, 206, 209, 210, 424.2, 424.4, 424

(56) References Cited

U.S. PATENT DOCUMENTS

2002/0025222 A1 * 2/2002 Attar ........................... 404/16
2002/0196542 A1 * 12/2002 Nilsen et al. ................ 359/530

* cited by examiner

*Primary Examiner*—Arti R. Singh

(57) ABSTRACT

A continuously formed, low profiled reflective pavement marker comprising a multiple, inclined, low profiled reflective portions, which are integrally connected by horizontally, positioned reflective sheeting. Each raised reflective portion integrally having multiple reflective cube corner elements within two defined inclined reflective faces. Each of the two opposite reflective faces are integrally supported by load carrying structural walls in a multi-directional manner, said load carrying structural walks define cell like areas within each inclined reflective face. A method of making said reflective marker is disclosed that includes the steps of sealing and coloring the lower portion of the reflective marking sheet.

5 Claims, 8 Drawing Sheets

ONE-PIECE REFLECTIVE MARKING SHEET

FIELD OF THE INVENTION

This invention relate to forming reflective pavement marking article with multiple, precise raised reflective faces which monolithically including micro cube corner reflective elements within defined cell like areas.

BACKGROUND

Unitary raised reflective pavement marking have been extensively used to direct roadway traffics by retro reflecting incident lights to incoming automobiles.

This type of reflective marking usually augmented either by several non-reflective markers, intermittent paint strips or sheets of polymeric stripping.

Varieties of raised reflective marking products are readily available for use directly on roadway, thereby complimenting paint striping or other raised non-reflective markers.

Alternatively, various sheet marking have been developed as an alternative composition for such long, intermittent lane marking for roadway.

Several methods of making reflective sheeting for such pavement marking have been developed. Such previous arts include multiple raised portions with retro-reflectivity.

As an example, U.S. Pat. No. 6,303,058 B1 to Kelley et al that uses a top, preformed reflective sheet with pre-embossed cube corner reflective elements.

This sheeting comprised of multiple, preformed and bonded laminate that needs to be bend into multiple raised portions without any integrally formed load carrying walls, then applying a filling material into the cavities to provide the structural support needed and to retain the raised reflective faces in position.

Other available arts of making reflective sheets with multiple, raised reflective regions are the type that embed optical elements, such as preformed spherical beads, into a binder resinous layer, as in U.S. Pat. No. 6,326,053 B1 assigned to 3M innovative Property Company. Various arts of forming or embossing cube corner elements on either specific length of plastic articles or on continuous sheeting are available; U.S. Pat. No. 3,712,706 to Stamm, which is incorporated herein by this reference, explains in detail the method of forming such reflective sheeting. Also referenced herein are U.S. Pat. No. 3,873,184 to Heenan et al; U.S. Pat. Nos. 3,684,348, 3,689,346, 3,810,804 and 4,244,683 to Rowland and U.S. Pat. No. 4,025,159.

The object of this invention is to provide a novel method of integrally forming a by-directional partition and load carrying walls in support of each two opposing, raised reflective faces within a reflective sheeting, thereby eliminating the need for back-filling these protruded cavities with resinous material for structural support.

It is further objective of this invention is to provide a method of manufacturing reflective sheeting having multiple, raised reflective faces in relatively inexpensive and with uniform dimension.

The incorporation of monolithically formed load carrying structural walls defining multiple cube corner elements within cell like areas has been explained in detail in U.S. Pat. No. 6,334,734 and application Ser. No. 09/982,044 belonging to this applicant, which are incorporated herein by this reference.

SUMMARY OF INVENTION

The present invention relates to improved pavement marking having low profiled reflective faces with multiple of integrally formed strippings.

The present invention also includes an efficient method of fabricating the reflective pavement marker.

The reflective faces as well as the integrally connected stripping portions incorporate multiple of micro-prismatic cube corner reflective elements within the internal surfaces of the cell like areas. The cell like areas are defined by a multi directional or by directional load carrying partition walls depending on the size and height of the reflective faces being incorporated.

Several methods are available for manufacturing the present invention.

A continuous method of production would include a compression molding techniques.

This method comprises of a continuously fed, optically transparent sheet which pass through cavity pre-forming station under sufficient vacuum or pressure to pre-form a contoured surface nearly the shape of the cavities of the compression molding die.

This top transparent continuously fed sheet can be made of acrylic, polycarbonate or other transparent and ultra violet stable resin of good optical transparency. This transparent sheet can also be pre coated with abrasion resistance hard carbon, silicone dioxide or aluminum trioxide film, utilizing reactive sputtering or chemical vapor deposition methods.

Then a resin dispensing station would inject a transparent, resinous fill material.

The pre-calendared, filled surface then move to a compression molding station having a core segment that simultaneously imprint both, the cube corner reflective elements as well as the load carrying partition walls monolithically on top of said transparent sheet then cure the composite marker.

A compatible sealing sheet would be laid at the base area of the composite marking article, then welding to said base region to form the final reflective pavement marker.

A conveyerized rotational means can continuously move the cavity portion of the compression die, thereby strip release the finished pavement marker onto the next station of cutting and packing.

The production method may include several in between substation such as vibrating the fill surface to eliminate air bubbles, heat, air or cooling water supplies or trimming equipments, as needed.

The raised reflective pavement marker of the present invention includes several advantages over other sheet type or single reflective pavement markers.

This type of reflective marking are suited for replacing the combined pavement lane stripping as well as the raised reflective markers used with such lane stripping. It also can be used as pavement signs and directional markings.

Additionally, this type of retro-reflective marking can be very effective for pedestrian crossing, especially during intensive rain.

This type of sheeting can also find used on vertical objects such as truck trailers, vertical posts, embankments, side curbs, delineators, etc.

BRIEF DESCRIPTION OF THE DRAWINGS

The invention will be described in connection to the accompanied drawings in which.

DETAILED DESCRIPTION OF THE ILLUSTRATED EMBODIMENTS

Figure 1:
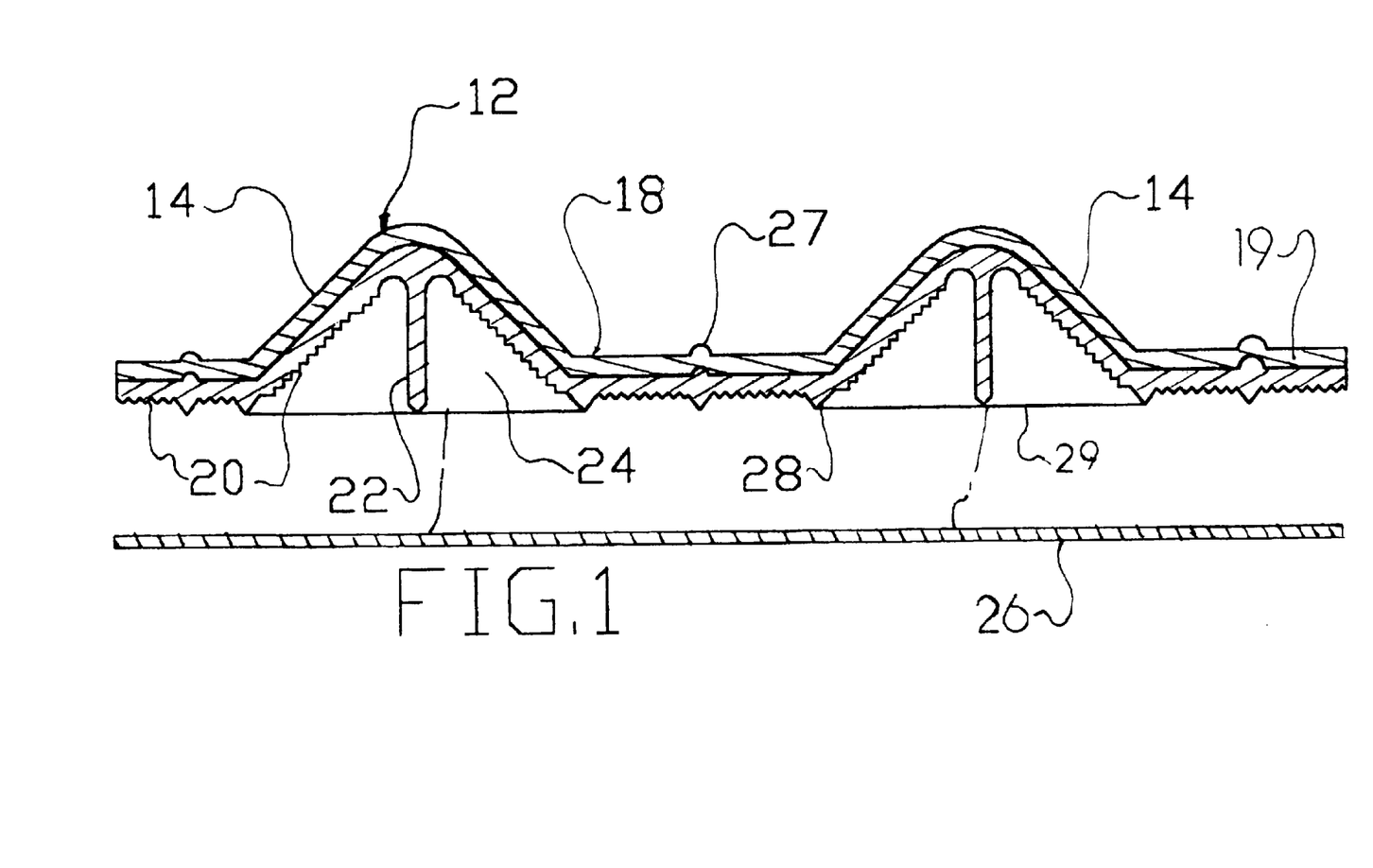
FIG. 1 is a cross section of a segment portion of a reflective pavement-marking sheet.
Figure 2:
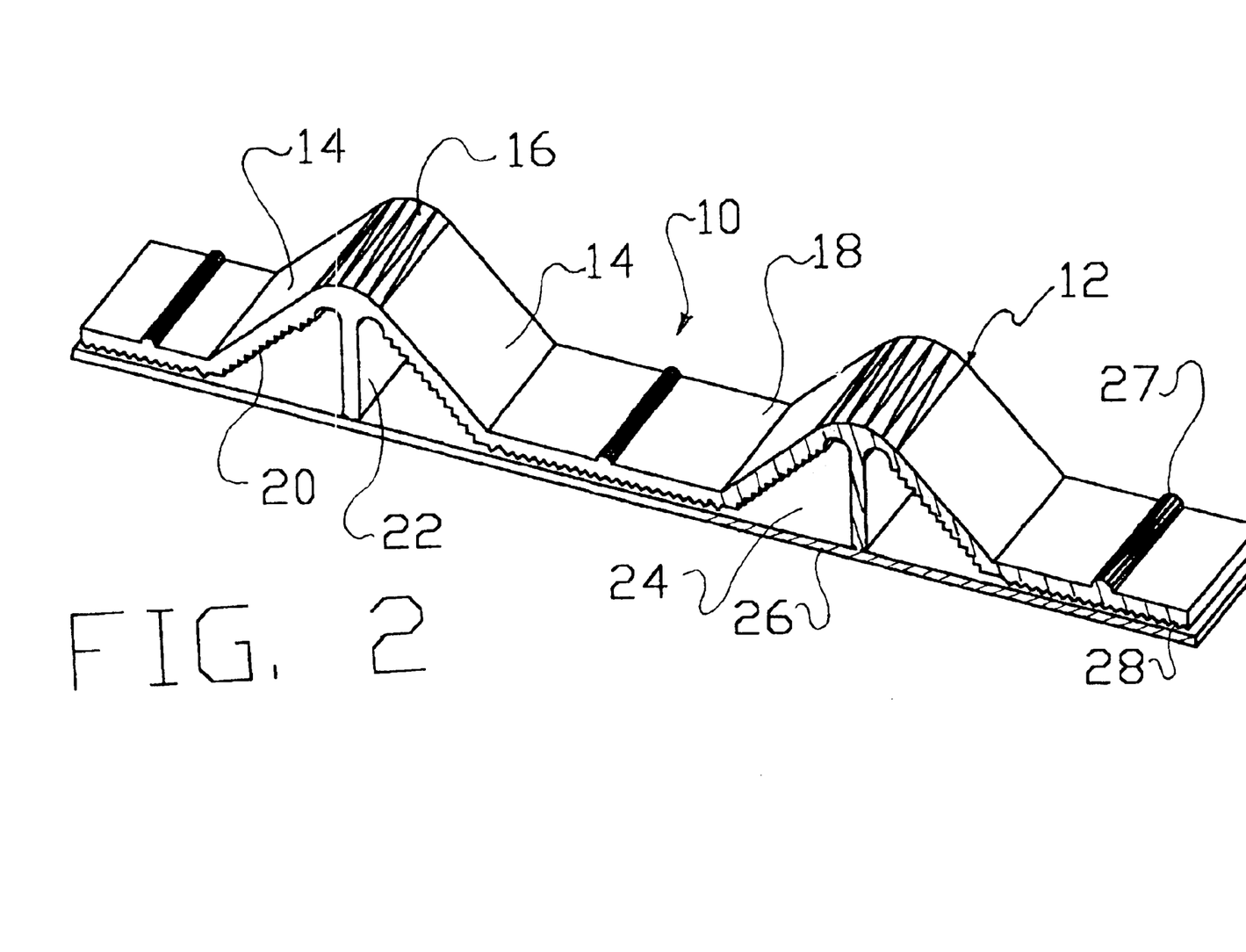
FIGS. 2, 3 are isometric view of a cross section segment for a reflective pavement marking.

Referring now to FIGS. 1 and 2 of the drawings, shows a fragmentary cross section view of a portion of the embodiments of this novel reflective pavement marking sheet, said fragment is designated as marker 10 which comprises multiple raised reflective portions 12 each followed by a planar reflective flat portion 18. A typical reflective marking sheet contain multiple raised reflective portions 12 intermittently connected with planar reflective portion 18. The length of such reflective sheet having multiple reflective portions 12 can be substantially continuous to any desired length that would be applicable for roadway usage.

Each raised reflective portions 12 have an exterior comprising of a top surface 16, two inclined reflective faces 14 on opposite directions, two inclined or arcuate sides 29.

Figure 8:
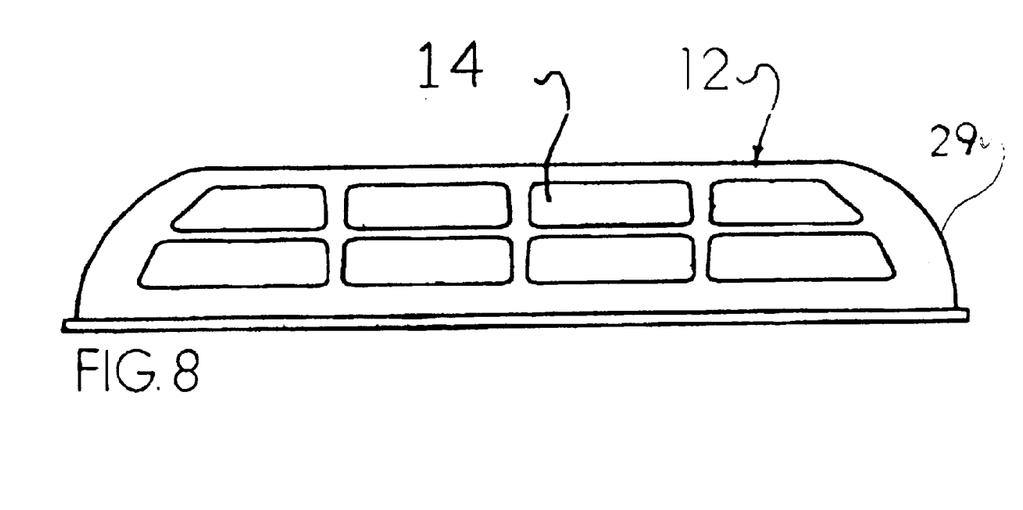
Figure 9:
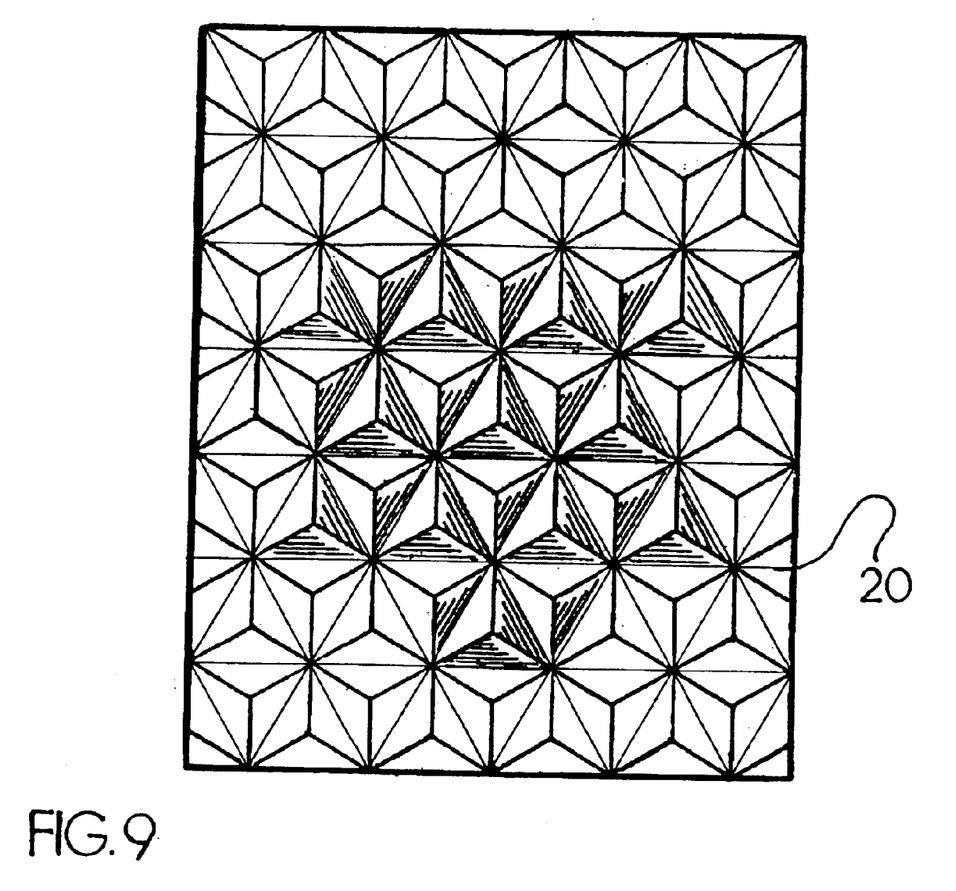
FIG. 9 is a magnified plane view depicting range in the hexagonal array of cube corner retro reflectors used in accordance with present invention.

When the desired reflective portions 12 is having significantly higher profile of about 0.2 to 0.5 inch arcuate sides 29 can be formed intermittently, as shown in FIG. 8, and at any desired intervals within a giving width of said reflective pavement marking sheet 10. For reflective portions 12 with lesser heights, the sides 29 can have simple inclined surfaces.

Each of the inclined reflective faces 14 has an inside surface with multiple of integrally formed micro cube corner reflective elements 20 defined by multi directional load carrying partition walls 22. Inclined reflective face 14 form an internal angle of about 25 to 35 degrees with respect to the base surface.

Figure 7:
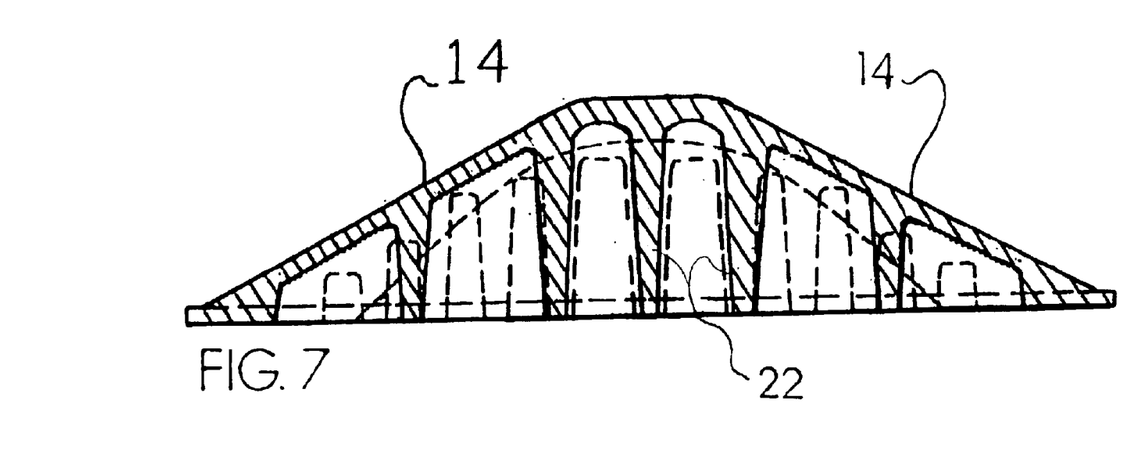
FIGS. 7, 8 show a cross section and elevation views of a high profiled, raised reflective portion in accordance to present invention.

A preferred high profiled reflective portion 12, can have partition walls 22 sub divided into multiple walls, as shown in FIG. 7.

FIG. 8 shows a typical elevation view of a high profiled reflective portion 12.

Hollow cavities 24 are integrally formed separating the apexes of the cube corner reflective elements 20 within inside of each inclined reflective face 14. The multi directional load carrying partition walls 22 provide structural support for the reflective portions 12.

The reflective flat portions 18, which integrally connect each two raised reflective portions 12, have exterior planar surfaces that may incorporate slightly raised bumpers 27 and a lower base surface integrally formed with multiple cube corner reflective elements 20.

Reflective elements 20 can be formed within cell like areas defined by slightly raised ridges 28 or it can be without any boundaries or ridges 28.

Bumpers 27 can be eliminated when the reflective flat portions 18 are short spanned. A backing sheet 26 is welded onto the lower base surface of the reflective flat poretions 18 and the tips of the load carrying partition walls 22 within each raised reflective portions 12. Adhesive may be pre applied to the exterior surface of the backing sheet 26 for adhesion to the roadway surface.

Various polymeric materials may be used to form the reflective pavement-marking sheet 10. The polymeric material can be either in a composite form or a single polymer having a high resiliency, good abrasion resistance and ultra violate resistance. Polymer such as polymethyl methacrylate, polybutyle acryl ate, cellulose esters or polycarbonate are among the preferred resins used to form pavement marker 10.

Figure 3:
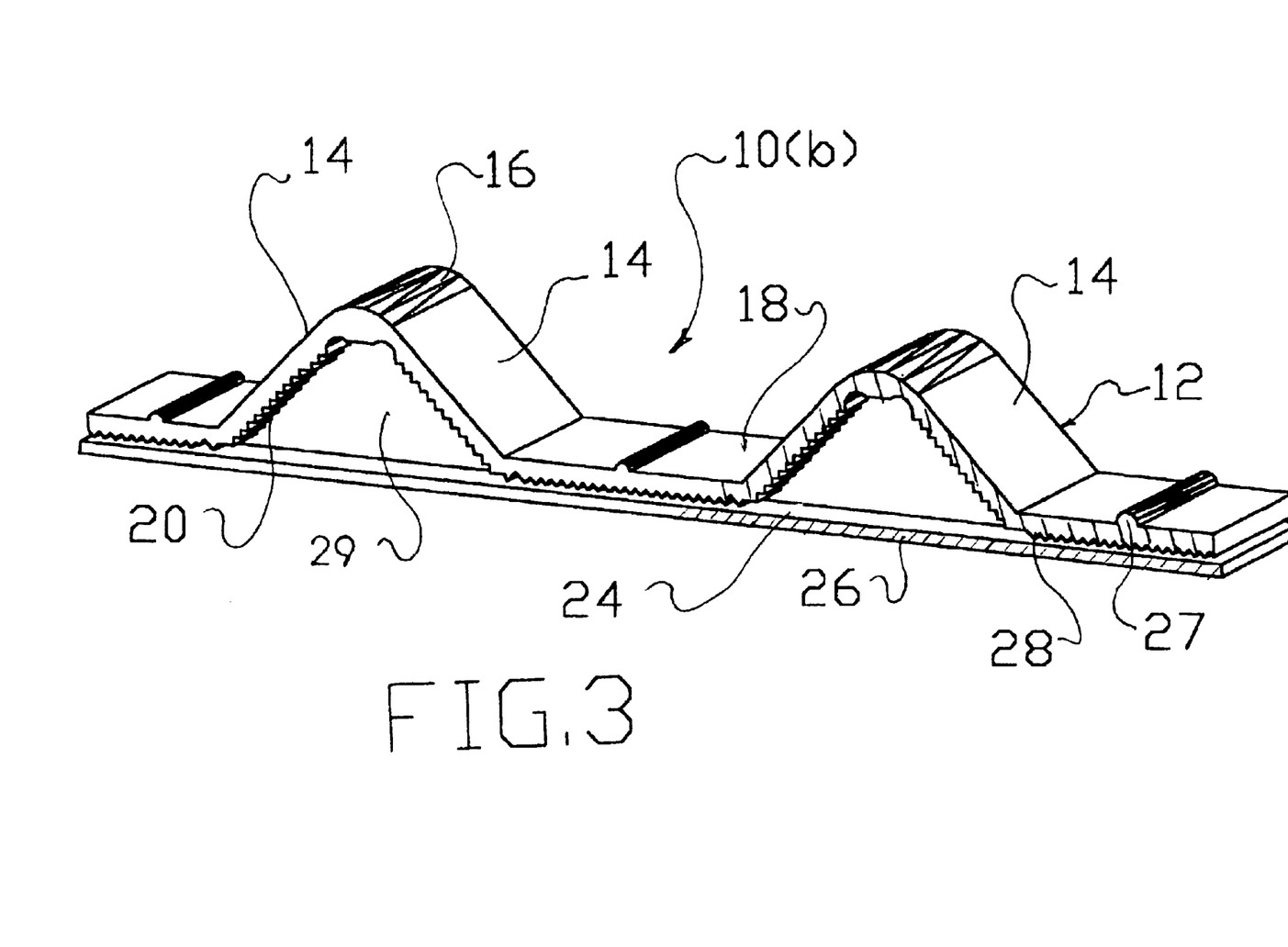

FIG. 3 shows an isometric view of a section for another embodiment, a segment of a reflective pavement marker 10b which is essentially the same as pavement marker 10 having raised reflective portions 12 with only one directional load carrying partition walls 29 that support the reflective faces in the direction of traffic. This type of reflective pavement marker is adequate when low-profiled reflective portions 12 are preferred.

Reflective pavement marker 10b can be formed using direct embossing method where the cube corner reflective elements 20 are formed on the interior portion of a pre formed transparent sheet, using compression molding process.

Figure 4:
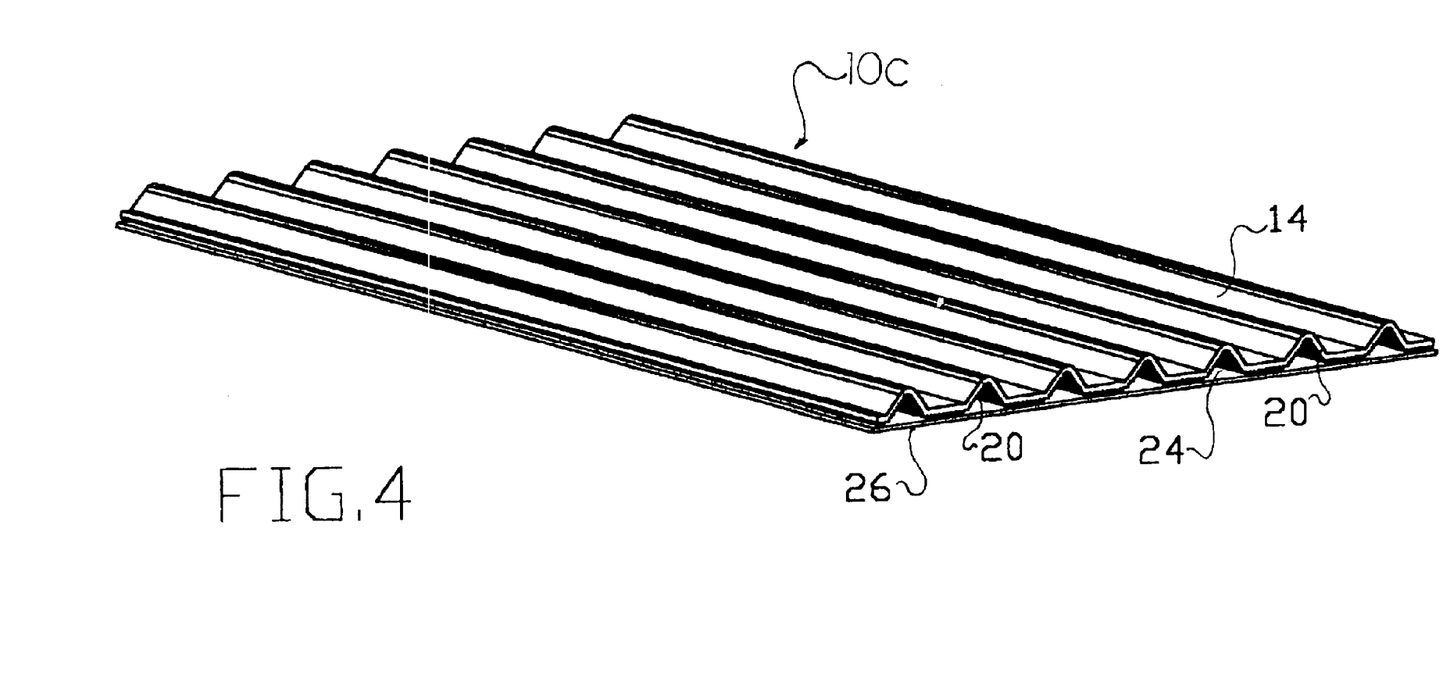
FIG. 4 is a segment of a pavement marker used for pedestrian crossing that can be formed in accordance to the invention.

FIG. 4 shows a segment of a reflective marker sheet that can be used for pedestrian crossing or barrier marking having multiple of long raised reflective portions 12 facing the traffic direction.

Directional arrows or other signs can be cut from this type of reflective marking sheet, with variation in cross-sections of present innovative invention.

When a composite material is used to form pavement marker 10, a transparent colorant can be added to the polymeric material forming either the upper or lower portion there off.

It would be essential that the polymeric components selected for forming reflective pavement marker 10 to be compatible with each other and tenaciously adhere to each other.

The reflective flat portion 18 between each two raised reflective portions 12 can be about 1 to 48 inches, depending on the size of the raised portions 12 integrally incorporated within a reflective marking sheet.

Figure 5:
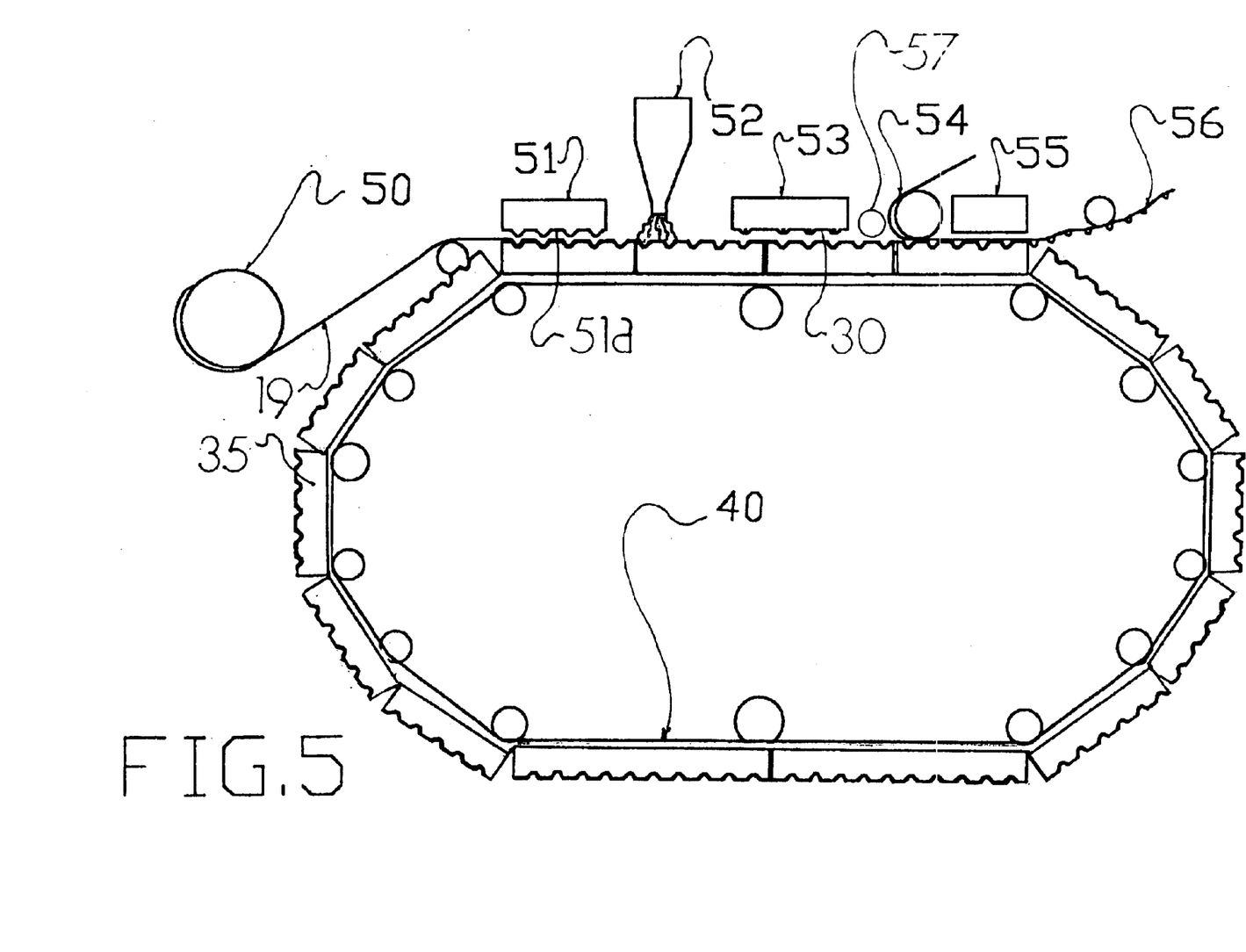
FIG. 5 is a schematic view of a preferred apparatus showing the sequence of a production method in accordance to the invention.

FIG. 5 shows a diagrammatic illustration of a preferred stepss in a continuous production apparatus for the fabrication of reflective pavement marking sheet.

Figure 6:
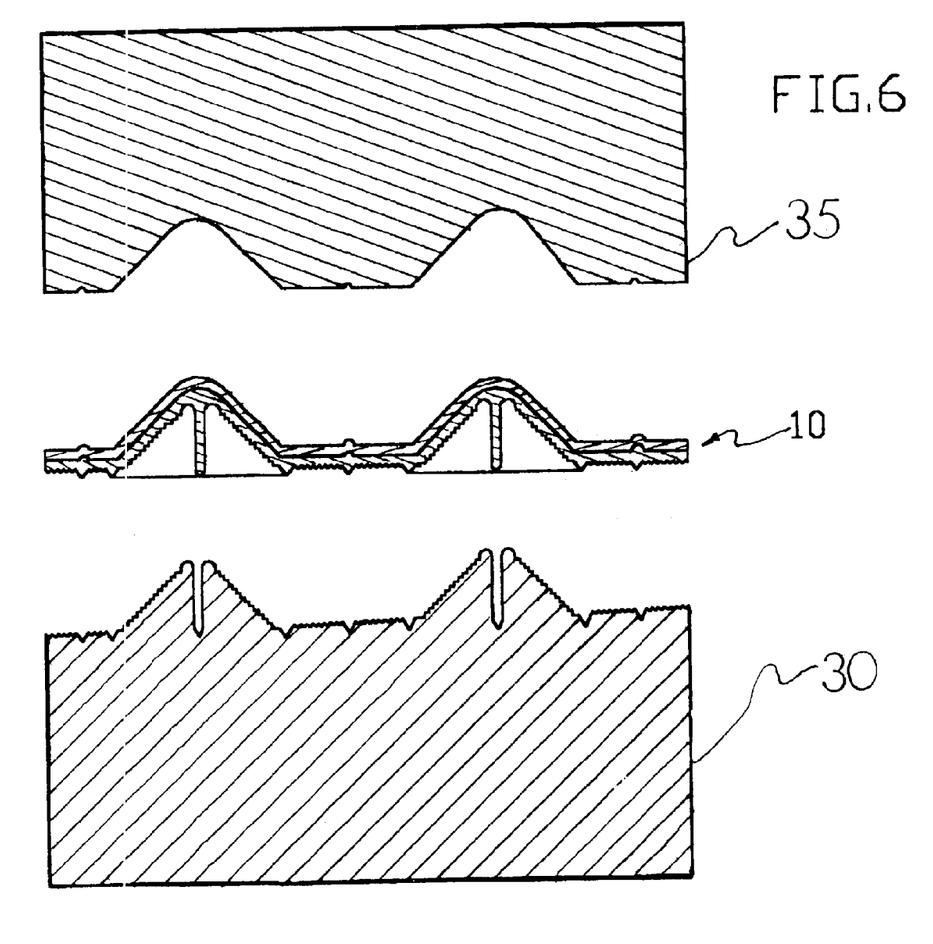
FIG. 6 is a magnified cross sectional segment of a compression-molding tool for forming the retro reflective pavement-marking sheet.

The production apparatus includes a rotationally movable carriage means 40 that is generally comprises of a belt structure that includes multiple portions of the cavity side for the compression molding station 53. If needed, heating, pressure, air and cooling elements can be incorporated into the cavity segments 35 within the carriage means 40. A magnified cross sectional segment of typical elements of a compression die 53 is shown in FIG. 6.

Referring now to the fabrication process, transparent sheet line 19 of a polymeric material is fed thru station 50 onto a horizontally positioned region directly above a horizontal segment of the rotationally movable carriage means 40. Carriage means 40 sequentially moves multiple cavity portions 35 toward the compression die station 53.

At the pre-shaping station 51 the sheet line 19 is slowly molded into the cavities of the movable carriage means 40 at the horizontal segment. This pre-shaping station may apply vacuum or just mechanical means or both for pre-forming the desired exterior shape of the reflective pavement marker 10.

The sheet line 19 at station 51 would be in a slack mode, thereby allowing either the mechanical smooth core 51a or the vacuum means within station 51 to shape exterior portion of said reflective pavement marking sheet 10. The mechanical smooth core 51a can be designed to operate sequentially utilizing various sliding means that can be incorporated as part of the core elements (51a), thereby pushing the sheet 19, first by the furthest smooth faced core 51a into the corresponding cavity 35 within carriage 40, then the next core elements thereof. Using thicker sheet 19 can provide an alternative means so that sheet 19 would not splinter during the pre-compression or vacuuming into the cavity shaped position.

Heating, pressure, air and cooling means would be available at station 51 for use as needed. Next station 52 is a pressurized resin dispensing system that can be fitted with a metering device, heating timer, manifold and a mixing head for injection of an optically transparent viscous resin. This station 52 can be fitted with a recycling shoot and an override mechanism so that if accidental material dispensing takes place, it can be over ridden manually, thereby utilizing pre mixed patches of resin. An internal release additive may be incorporated into the transparent resinous polymer or an external release agent may be applied to the compression molding dies, or both as needed.

Station 57 is a calendaring roller or skimmer to retain any access resinous material and divert it into a recycle tank. Station 57 can be supported with vibration devices to eliminate air bubbles that may be entrapped during resin injection process.

Station 53 is the compression molding segment of this continuously forming cycle, which is fitted with the core heads 30, either in a singular core head or multiple core heads as shown in FIG. 5.

A magnified cross section segment of one of the core heads 30 is shown in FIG. 6 together with a segment cross section of a reflective pavement marker 10.

Also shown in FIG. 6 is a cross section segment of the corresponding cavities 35 that would be attached to the rotational carriage means 40.

Station 53 is provided with pressure, heating, cooling, air and water lines to be used as needed. Core head 30 has multiple micro prismatic cube corner reflective element pins together with the cavities for forming the multi directional load carrying partition walls 22. Several methods can be used to fabricate core head 30. One of the preferred methods is to electroform the entire upper part to a thickness of about 0.3 to 0.5 inch or more if needed from metal alloys such as nickel cadium then a backing or thickening metal will be applied to strengthen the first, upper detailed segment. All cavity moldings for the load carrying partition walls 22 as well as the hexagonal micro cube corner reflective elements 20 would be within this core segment 30.

Proper draft slopes would be incorporated within the wall limits of this core molding to allow uninterrupted release after compression cycle time.

After the compression molded segment 10 is cured, an additional time station or space may be required for cooling interval of the composite sheet formed by bonding of the transparent sheet surface 19 to the cured resinous material defining the cube corner elements 20 and the wall elements 22.

A release agent may be incorporated into the resinous material or externally applied to the core and cavity to allow proper separation of the finished sheet.

Next station 54 is for applying the backup protective sheet 26, which is a thin and compatible plastic, to the base portion of the reflective pavement marker 10.

The backup sheet 26 can be either agglutinated or welded onto either a designated, raised wedge like walls 28, forming rectangular grid like cells within the lower surface of planar reflective sheet 18, or can be directly welded onto the apexes of the multiple cube corner reflective elements 20 within said lower surfaces of planar reflective sheets 18 and the tips of the wedge shaped ends of the load carrying walls 22.

When abrasion resistance surface is needed the continuously rolled transparent sheet 19 can be pre-coated continuously with aluminum trioxide, hard carbon or silicone dioxide utilizing one of various chemical vapor deposition methods or reactive sputtering method. The substantially continuous transparent sheet 19 can also be made with any desired transparent coloration. The reflective pavement marker sheet can also have only the lower, prismatic cube corner reflective elements impregnated with transparent colorant prior to compression molding the reflective pavement-marking sheet. Both the transparent sheet 19 and the resinous polymer have to be highly stable against ultra violate light.

Station 55 is for pre application of adhesive to the base surface prior to reaching the cutting and storage station 56.

Various thickness of the transparent sheet 19 can be used in this process depending on the size of the protruding reflective portions 12. Commonly used thickness for sheet 19 is about 0.002 to 0.05 inch.

Once the combined composite reflective pavement marking sheet to advance from station 55 to the cutting and storage station 56, the rotational direction of the cavity portions 35 within station 40 will allow the release of the finished product toward the cutting region. Stations 50 thru 55 can be synchronized to functions either simultaneously or sequentially with an override control within every station.

It is clearly understood that this method is applicable to manufacturing one-piece single reflective pavement markers as in U.S. Pat. No. 6,334,734, application Ser. Nos. 09/634,430, 09/880,780 and 09/982,044 to Attar with minor adjustment and cutting retrofits. Alternative methods of continuous production of this novel invention can be achieved. An example of such alternative would include modified stations within a method such as in the previous art of U.S. Pat. No. 3,689,346 to Rowland. This is especially feasible when the desired reflective marking 10 require very low profile, having a reflective portions 12 with a height equal or less than 0.20 inch. While the cavity portion of such embossment can be incorporated as a belt around a drum of various sizes or forms, then a transparent flexible film 19 is applied to the cavity belt A corresponding pressure drum with the core elements fixed on a belt, mounted onto said drum. This core belt drum must have synchronized reverse motion with respect to the cavity drum.

A designated spacing is to be allowed between the two reverse moving drums, thereby filling the cavities within the embossment molding created between the two drum faces, whereby embossment of the cube corner reflective elements 20 as well as the load carrying partition walls 22 will takes place.

In order to complete this process cycle, an additional station must be added to allow the adhesion of a backing, protective-sheeting 26 onto the lower portion of the continuously formed reflective sheeting 10 to complete such production process.

It is understood that various changes or modifications can be made within the scope of the appended claims for the above-preferred methods for forming the present reflective pavement-marking article without departing from the scope and the spirit of the invention. The principle processes of this invention are not limited to the particular embodiments described herein. Various embodiments can employ the processes of this invention. This invention is not limited to the exact methods illustrated and described; alternative methods can be used to form the intended reflective pavement marker of this invention. Therefore, the invention can be practiced otherwise than as specifically described herein.

What is claimed is:

1. A one-piece retro reflective pavement marking sheet comprising: integrally formed upper reflective surface and lower protective sealant sheet, said upper reflective surface having multiple, inclined reflective portions, each followed by a planar horizontally positioned reflective sheet, said inclined reflective portions each having an arcuate top, inclined or arcuate sides and two oppositely positioned inclined planar reflective faces, said inclined planar reflective faces each having a planar outside and an inside surface having multiple, integrally formed micro cube corner reflective elements, said inclined reflective faces each forming an angle of about 25 to 35 degrees with respect to the planar base surface; load carrying partition wall means for providing structural support and defining substantially hollowed inside surfaces of said raised reflective portions, said planar horizontally positioned reflective sheet each having an outside planar surface and an inside surface integrally formed with multiple micro cube corner reflective elements.

2. The one-piece retro reflective pavement marking sheet as defined in claim 1, wherein the reflective faces of said reflective portions and the planar, horizontally positioned reflective sheets can be formed having exterior surfaces with cell-like regions defined by slightly raised ridges to eliminate tire contact.

3. The one-piece retro reflective pavement marking sheet as defined in claim 1, wherein the entire base region of said upper reflective surface is backed with a flexible, protective sealant sheet, said sealant sheet is being welded onto the wedged ends of said load carrying partition walls and portion of the apexes of said multiple cube corner reflective elements within each horizontally positioned reflective sheet areas.

4. The one-piece reflective pavement marker sheet as claimed in claim 1, wherein the raised reflective portions are of about 0.05 to 0.50 inch in height and of about 0.5 to 12 inches in width.

5. The one-piece reflective pavement marking sheet as claimed in claim 1, wherein each horizontally positioned reflective sheet longitudinally connecting each two rows of said raised reflective portions is about 0.50 to 36 inches in length, said horizontally positioned reflective sheets can have grid like raised wedges of about 0.005 to 0.05 inches to eliminate direct tire contact, said horizontally positioned reflective sheets having inside surfaces with multiple micro cube corner reflective elements.

* * * * *